(12) United States Patent
Wada et al.

(10) Patent No.: US 7,527,744 B2
(45) Date of Patent: *May 5, 2009

(54) NICUZN-BASE FERRITES AND ELECTRONIC PARTS USING THE SAME

(75) Inventors: Ryuichi Wada, Tokyo (JP); Takuya Aoki, Tokyo (JP); Hiroshi Momoi, Tokyo (JP); Yukio Takahashi, Tokyo (JP); Takahiro Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 11/468,599

(22) Filed: Aug. 30, 2006

(65) Prior Publication Data
US 2007/0138431 A1   Jun. 21, 2007

(30) Foreign Application Priority Data
Dec. 21, 2005   (JP) ............................. 2005-368381

(51) Int. Cl.
*H01F 1/34* (2006.01)
(52) U.S. Cl. ................ 252/62.6; 252/62.62; 252/62.59; 333/185; 336/117; 336/221; 336/233; 336/234
(58) Field of Classification Search ................ 252/62.6, 252/62.62, 62.59; 333/185; 336/117, 221, 336/233, 234
See application file for complete search history.

(56) References Cited

U.S. PATENT DOCUMENTS 7,378,036 B2 *   5/2008   Wada et al. ................ 252/62.6
2006/0116283 A1 *   6/2006   Wada et al. ................ 502/150

FOREIGN PATENT DOCUMENTS

| JP | 10-223424 | 8/1998 |
| JP | 2002-124408 | 4/2002 |
| JP | 2002-141215 | 5/2002 |
| JP | 2002-255637 | * 9/2002 |
| JP | 2003-272912 | 9/2003 |

OTHER PUBLICATIONS translation for 2002-255637.*

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

An NiCuZn-base ferrite of the invention comprises as main components an iron oxide in an amount of 45.0 to 49.0 mol % on $Fe_2O_3$ basis, an copper oxide in an amount of 5.0 to 14.0 mol % on CuO basis and a zinc oxide in an amount of 1.0 to 32.0 mol % on ZnO basis with a nickel oxide accounting for the rest mol % on NiO basis. With respect to the main components, a bismuth oxide is contained in an amount of 0.25 exclusive to 0.40% by weight on $Bi_2O_3$ basis, and a tin oxide is contained in an amount of 1.00 to 2.50% by weight on $SnO_2$ basis. The invention ensures a leap upward in direct-current bias characteristics.

5 Claims, 1 Drawing Sheet

NICUZN-BASE FERRITES AND ELECTRONIC PARTS USING THE SAME

BACKGROUND OF THE INVENTION

1. Field of the Invention

The present invention relates generally to an NiCuZn-base ferrite and an electronic part using it, and more particularly to a ferrite used as a material for electronic parts that form a closed magnetic circuit and an electronic part fabricated using it.

2. Explanation of the Prior Art

So far, ferrites in the form of oxide magnetic materials containing Ni, Cu, Zn, etc., because of possessing good magnetic properties, have been used as core (magnetic core) materials for various electronic parts or as materials for inductor parts such as multilayer chip inductors.

For such magnetic cores or inductor parts, it is desired that, in consideration of varying temperature environments where they are used, the rate of changes in their initial permeability μi with changing temperatures be reduced or limited; that is, the temperature dependency of their initial permeability μi be in good condition (or fluctuate little with temperature).

Here, when it comes to an electronic part including a coil conductor such as a multilayer chip inductor, inductance can decrease depending on a current value as direct currents pass through the coil conductor in a closed magnetic circuit. For an electronic part, inductance decreases must be reduced as much as possible even with relatively large currents passing through it. It is thus desired that the rate of inductance changes be reduced or limited applying direct-current bias; that is, DC bias characteristics be in good condition.

To meet such demands, JP-A-2003-272912 has come up with an oxide magnetic material comprising an Ni—Cu—Zn ferrite material having a given composition as a main component with 0.2 to 3 wt % of $SnO_2$ added to it for the purpose of achieving an oxide magnetic material that is used for an closed magnetic circuit-forming electronic part, and that, even at a large applied external stress, can ensure the desired magnetic properties and has good direct-current bias characteristics as well, and a multilayer electronic part using the same. The publication alleges that even at an applied compression stress of 40 MPa, the rate of change in its initial permeability is kept within 10%, and good direct-current bias characteristics is gained. By the addition of $SnO_2$ alone, however, there would be no significant improvement in direct-current bias characteristics.

JP-A-2002-255637 has proposed an oxide magnetic porcelain composition comprising an Ni—Cu—Zn ferrite material having a given composition as a main component and further containing 1.5 percent by weight to 3.0 percent by weight of $SnO_2$, 0.02 percent by weight to 0.20 percent by weight of $Co_3O_4$ and up to 0.45 percent by weight of $Bi_2O_3$ with a view to achieving an oxide magnetic porcelain composition with little or no characteristic value change due to temperature changes and, at the same time, with high specific resistance, and an inductor part using the same. The publication alleges that there is a high-performance electronic part obtainable, which has little or no characteristic value change due to temperature changes and, at the same time, has so high specific resistance that eddy-current losses are reduced with a Q value improvement.

However, the art of that publication is not to improve on direct-current bias characteristics, nor is there any disclosure of the composition of the invention in its specific examples. For instance, at the same initial permeability μi on the order of 80 to 130 with all other conditions being equal, there would be no NiCuZn-base ferrites as yet, where much improved direct-current bias characteristics as achieved herein is available.

Such being the situation, the invention has for its object the provision of a ferrite with a dramatic improvement in direct-current bias characteristics, and an electronic part using the same.

SUMMARY OF THE INVENTION

According to one aspect of the invention, such an object is accomplishable by the provision of an NiCuZn-base ferrite comprising as main components an iron oxide in an amount of 45.0 to 49.0 mol % on $Fe_2O_3$ basis, a copper oxide in an amount of 5.0 to 14.0 mol % on CuO basis and a zinc oxide in an amount of 1.0 to 32.0 mol % on ZnO basis with a nickel oxide accounting for the rest mol % on NiO basis, wherein, with respect to said main components, a bismuth oxide is contained in an amount of 0.25 exclusive to 0.40% by weight on $Bi_2O_3$ basis, and a tin oxide is contained in an amount of 1.00 to 2.50% by weight on $SnO_2$ basis.

Another aspect of the invention is concerned with an electronic part comprising an NiCuZn-base ferrite, wherein said ferrite comprises as main components an iron oxide in an amount of 45.0 to 49.0 mol % on $Fe_2O_3$ basis, a copper oxide in an amount of 5.0 to 14.0 mol % on CuO basis and a zinc oxide in an amount of 1.0 to 32.0 mol % on ZnO basis with a nickel oxide accounting for the rest mol % on NiO basis, wherein, with respect to said main components, a bismuth oxide is contained in an amount of 0.25 exclusive to 0.40% by weight on $Bi_2O_3$ basis, and a tin oxide is contained in an amount of 1.00 to 2.50% by weight on $SnO_2$ basis.

In a preferred embodiment of the invention, said electronic part is in the form of a multilayer inductor or LC composite part that includes a coil conductor and a core portion comprising said ferrite, wherein said core portion forms a closed magnetic circuit.

The NiCuZn-base ferrite of the invention is such that with respect to the given main component blend composition, there is a very narrow range of 0.25 exclusive to 0.40% by weight for the bismuth oxide on $Bi_2O_3$ basis, and 1.00 to 2.50% by weight for the tin oxide on $SnO_2$ basis; however, there is a leap upward achieved in direct-current bias characteristics within such narrow a range.

DETAILED EXPLANATION OF THE INVENTION

Figure 1:
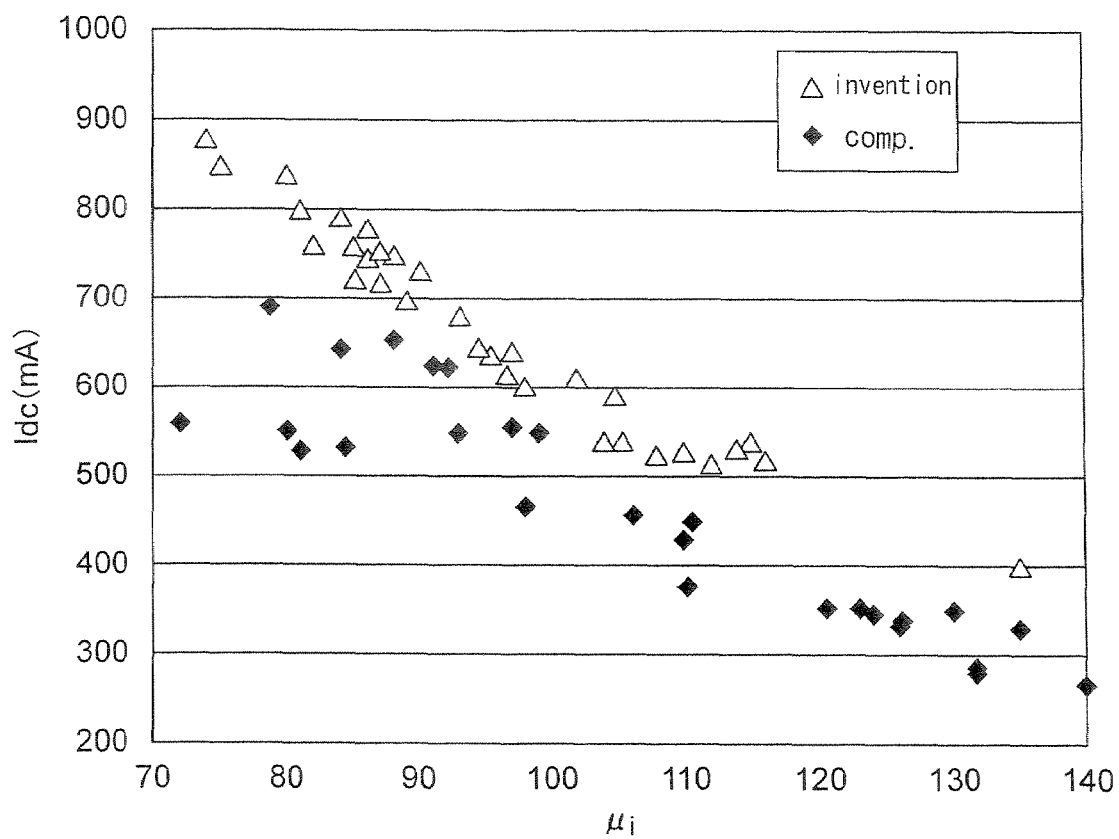
FIG. 1 is a graph indicative of a set of results in Table 1, with initial permeability μi as abscissa and a current Idc (synonymous with $I_{dc10\%down}$) at which the initial permeability μi is 10% down as ordinate.

The NiCuZn-base ferrite (oxide magnetic material) of the invention is now explained in details.

The NiCuZn-base ferrite of the invention comprises as substantial main components an iron oxide in an amount of 45.0 to 49.0 mol % (most preferably 47.0 to 48.8 mol %) on $Fe_2O_3$ basis, an copper oxide in an amount of 5.0 to 14.0 mol % (most preferably 7.0 to 12 mol %) on CuO basis and a zinc oxide in an amount of 1.0 to 32.0 mol % (most preferably 14.0 to 28.0 mol %) on ZnO basis with a nickel oxide accounting for the rest mol % on NiO basis.

Further, the NiCuZn-base ferrite of the invention contains as auxiliary components a bismuth oxide in an amount of 0.25 exclusive to 0.40% by weight (most preferably 0.26 to 0.33% by weight) on $Bi_2O_3$ basis, and a tin oxide in an amount of 1.00 to 2.50% by weight (most preferably 1.00 to 2.20% by weight) on $SnO_2$ basis, with respect to such main components.

Referring here to the composition ranges for the main components, the content of the iron oxide ($Fe_2O_3$) being below 45 mol % is not preferable, because the specific resistivity tends to become low, and the initial permeability μi tends to become low, too. As the content of the iron oxide ($Fe_2O_3$) exceeds 49.0 mol %, on the other hand, it causes inconveniences like noticeable deterioration in sinter ability.

As the content of the copper oxide (CuO) is below 5.0 mol %, there can be inconveniences like deterioration in sinter ability. As the content of the copper oxide (CuO) exceeds 14.0 mol %, on the other hand, there can be inconveniences such as specific resistivity drops, and noticeable segregation at grain boundaries of the ferrite upon sintering.

As the content of the zinc oxide (ZnO) is below 1.0 mol %, the initial permeability μi becomes too low to be fit or preferable for electronic parts material. As the content of the zinc oxide (ZnO) exceeds 32.0 mol %, on the other hand, the Curie temperature is lower than 100° C., and there can be inconvenience like difficulty of practical use.

The composition ranges for the auxiliary components used with the main components are now explained. As the content of the bismuth oxide ($Bi_2O_3$) is 0.25% or less by weight, there can be inconveniences like no significant improvement in direct-current bias characteristics. As the content of the bismuth oxide ($Bi_2O_3$) exceeds 0.40% by weight, on the other hand, there can be inconveniences like abnormally grown particles that may otherwise degrade magnetic properties.

As the content of the tin oxide ($SnO_2$) is below 1.00% by weight, there can be inconveniences like no significant improvement in direct-current bias characteristics. As the content of the tin oxide ($SnO_2$) exceeds 2.50% by weight, on the other hand, there can be inconveniences like grave deterioration in sinter ability.

According to the invention, further additive components such as $Mn_3O_4$ and $ZrO_2$ could be used in addition to the main components plus the auxiliary components. The acceptable range of the additives to be added is such that the advantages of the invention are not adversely affected.

The ferrite material of the invention may be available in the form of a multilayer electronic part obtained by firing a stack of magnetic or dielectric sheets subjected beforehand to given processing, that is, a multilayer type inductor or a multilayer type LC composite part. For the multilayer type inductor, a plurality of ferrite composition sheets, each including an internal conductor for forming an coiled portion, may be stacked one upon another, and then fired.

The ferrite material of the invention may also be formed into a fixed inductor, a chip inductor or the like by, for instance, processing it into a core material of given shape, and winding the necessary wire around the core material, followed by resin molding (resin covering). These elements are in turn used as various electronic devices for televisions, video recorders, and mobile communications units such as cellular phones and car phones. By way of example but not by way of limitation, the core may be configured into a drum shape of 2 mm or less in both outside diameter and length.

For the resin used as the molding (covering) material, for instance, thermoplastic resins and thermosetting resins may be used. More specifically, polyolefin resins, polyester resins, polyamide resins, polycarbonate resins, polyurethane resins, phenol resins, urea resins, and epoxy resins may be used. Specific means for molding the molding material, for instance, include dipping, coating, and spraying. Besides, means such as injection molding and cast molding may be used.

One exemplary arrangement of the chip inductor (electronic part) using the ferrite of the invention is now explained. Typically, that chip inductor comprises a cylindrical core formed of the ferrite material of the invention with large diameter collars at both its ends, a wire wound around the barrel of the core, terminal electrodes adapted to connect the ends of the wire to an external electric circuit and located at both ends of the core for fixing the core in a resin, and a molding resin formed in such a way as to cover the outside of these components.

One exemplary process of fabricating the ferrite of the invention is now explained.

First of all, the starting material for the main components and the raw material for the auxiliary components (additives) in given amounts are blended together in such a way as to come within the given range for the ferrite of the invention to prepare the starting blend.

Then, the obtained starting blend is wet mixed in a ball mill or the like. The mixture is dried, and then calcined. Calcining is carried out in an oxidative atmosphere, for instance, in air. Preferably, the calcining temperature is 500 to 900° C. and the calcining time is 1 to 20 hours. The resulting calcined product is pulverized to the given size by means of ball milling or the like. For the ferrite of the invention, it is noted that the raw materials for the auxiliary components should preferably be added and mixed during (or after) that pulverization.

After the pulverization of the calcined product, the powders are formed into the desired shape with the addition to it of a suitable amount of a suitable binder such as polyvinyl alcohol.

The formed product is then fired. Firing is carried out in an oxidative atmosphere, usually in air. The firing temperature is about 800 to 1,000° C. and the firing time is about 1 to 5 hours.

The invention is now explained in further details with reference to specific examples.

Given amounts of the respective raw materials for the main components in the composition, $Fe_2O_3$, NiO, CuO and ZnO, were blended together in such a way as to give such composition ratios as shown in Table 1 below, and the blend was then wet mixed together for about 16 hours in a ball mill.

The resulting mixed powders were dried, and then calcined at 750° C. in air for 10 hours to obtain calcined powders. Given amount of the respective raw materials for the auxiliary components, $Bi_2O_3$ and $SnO_2$, were added to the calcined powders in such a way as to give such composition ratios as shown in Table 1 below, and pulverization was then carried out for 16 hours in a steel ball mill to obtain powders.

The ensuing powders (ferrite powders) were mixed together with the addition to it of a 6% polyvinyl alcohol solution, and then granulated by means of a spray dryer. The resulting granules were formed at a density of 3.10 Mg/m³ into a toroidal shape of 13 mm in outside diameter, 6 mm in inside diameter and 3 mm in height. The resulting compact was fired at 900° C. in the atmosphere for 2 hours to obtain a toroidal core sample.

Specifically, the compact was fired at two different temperatures, say, 900° C. and 920° C. in the atmosphere for 2 hours to obtain toroidal core samples fired at two such different temperatures for the same composition.

For each sample, measurements were taken of (1) initial permeability at 100 kHz and (2) direct-current bias characteristics, with the results set out in Table 1 below.

Note here that the measurements (1) and (2) were obtained as follows.

(1) Initial Permeability μi at 100 kHz

Twenty (20) turns of wire were wound around each toroidal core sample fabricated at the respective firing temperature of 900° C., and 920° C., after which inductance and other values were measured on an LCR meter to find initial permeability values $\mu i_{900}$ and $\mu i_{920}$ at 100 kHz and 25° C., with the numerical subscripts indicative of the firing temperatures.

(2) Direct-Current Bias Characteristics

For each toroidal core sample with about 20 turns of wire wound around it, measurements were taken of μ changes upon conduction of direct currents to prepare a μ vs. direct current graph. Then, this graph was used to calculate a current value at which the initial permeability μi at the time of a direct current 0 mA was down by 10%. In this way, the current value $I_{dc10\%down}$ (mA) at which the initial permeability μi was down by 10% was found.

TABLE 1

| Sample No. | Main Components (mol %) | | | | Auxiliary components (wt %) | | Firing Temp. 900° C. | | Firing Temp. 920° C. | |
|---|---|---|---|---|---|---|---|---|---|---|
| | $Fe_2O_3$ | CuO | ZnO | NiO | $SnO_2$ | $Bi_2O_3$ | $\mu i_{900}$ | $I_{dc10\%down}$ (mA) | $\mu i_{920}$ | $I_{dc10\%down}$ (mA) |
| 1 (comp.) | 48.0 | 8.8 | 17.2 | 26.0 | 0.50 | 0.13 | 81 | 530 | 110 | 376 |
| 2 (comp.) | 48.0 | 8.8 | 17.2 | 26.0 | 0.50 | 0.25 | 121 | 352 | 126 | 339 |
| 3 (comp.) | 48.0 | 8.8 | 17.2 | 26.0 | 0.50 | 0.28 | 123 | 353 | 124 | 346 |
| 4 (comp.) | 48.0 | 8.8 | 17.2 | 26.0 | 0.50 | 0.31 | 130 | 350 | 135 | 330 |
| 5 (comp.) | 48.0 | 8.8 | 17.2 | 26.0 | 0.50 | 0.34 | 144 | 317 | 145 | 320 |
| 6 (comp.) | 48.0 | 8.8 | 17.2 | 26.0 | 0.50 | 0.37 | 160 | 240 | 170 | 240 |
| 7 (comp.) | 48.0 | 8.8 | 17.2 | 26.0 | 0.50 | 0.50 | 150 | 230 | 155 | 226 |
| 8 (comp.) | 48.0 | 8.8 | 17.2 | 26.0 | 1.00 | 0.13 | 84 | 534 | 98 | 466 |
| 9 (comp.) | 48.0 | 8.8 | 17.2 | 26.0 | 1.00 | 0.25 | 106 | 457 | 111 | 449 |
| 10 | 48.0 | 8.8 | 17.2 | 26.0 | 1.00 | 0.28 | 108 | 525 | 112 | 515 |
| 11 | 48.0 | 8.8 | 17.2 | 26.0 | 1.00 | 0.31 | 109 | 530 | 110 | 532 |
| 12 | 48.0 | 8.8 | 17.2 | 26.0 | 1.00 | 0.34 | 104 | 540 | 116 | 520 |
| 13 | 48.0 | 8.8 | 17.2 | 26.0 | 1.00 | 0.37 | 105 | 518 | 135 | 400 |
| 14 (comp.) | 48.0 | 8.8 | 17.2 | 26.0 | 1.00 | 0.50 | 140 | 267 | 163 | 190 |
| 15 (comp.) | 48.0 | 8.8 | 17.2 | 26.0 | 1.50 | 0.13 | 79 | 692 | 93 | 549 |
| 16 (comp.) | 48.0 | 8.8 | 17.2 | 26.0 | 1.50 | 0.25 | 97 | 556 | 99 | 550 |
| 17 | 48.0 | 8.8 | 17.2 | 26.0 | 1.50 | 0.28 | 96 | 603 | 105 | 592 |
| 18 | 48.0 | 8.8 | 17.2 | 26.0 | 1.50 | 0.31 | 97 | 616 | 99 | 617 |
| 19 | 48.0 | 8.8 | 17.2 | 26.0 | 1.50 | 0.34 | 95 | 638 | 98 | 630 |
| 20 | 48.0 | 8.8 | 17.2 | 26.0 | 1.50 | 0.37 | 94 | 643 | 115 | 540 |
| 21 (comp.) | 48.0 | 8.8 | 17.2 | 26.0 | 1.50 | 0.50 | 132 | 287 | 152 | 205 |
| 22 (comp.) | 48.0 | 8.8 | 17.2 | 26.0 | 2.00 | 0.13 | 62 | 720 | 80 | 552 |
| 23 (comp.) | 48.0 | 8.8 | 17.2 | 26.0 | 2.00 | 0.25 | 91 | 625 | 92 | 624 |
| 24 | 48.0 | 8.8 | 17.2 | 26.0 | 2.00 | 0.28 | 89 | 700 | 93 | 682 |
| 25 | 48.0 | 8.8 | 17.2 | 26.0 | 2.00 | 0.31 | 86 | 748 | 90 | 733 |
| 26 | 48.0 | 8.8 | 17.2 | 26.0 | 2.00 | 0.34 | 87 | 755 | 88 | 750 |
| 27 | 48.0 | 8.8 | 17.2 | 26.0 | 2.00 | 0.37 | 82 | 780 | 85 | 770 |
| 28 (comp.) | 48.0 | 8.8 | 17.2 | 26.0 | 2.00 | 0.50 | 132 | 280 | 142 | 250 |
| 29 (comp.) | 48.0 | 8.8 | 17.2 | 26.0 | 2.50 | 0.13 | 58 | 720 | 72 | 560 |
| 30 (comp.) | 48.0 | 8.8 | 17.2 | 26.0 | 2.50 | 0.25 | 84 | 644 | 88 | 654 |
| 31 | 48.0 | 8.8 | 17.2 | 26.0 | 2.50 | 0.28 | 85 | 720 | 93 | 700 |
| 32 | 48.0 | 8.8 | 17.2 | 26.0 | 2.50 | 0.31 | 81 | 802 | 86 | 781 |
| 33 | 48.0 | 8.8 | 17.2 | 26.0 | 2.50 | 0.34 | 75 | 850 | 84 | 794 |
| 34 | 48.0 | 8.8 | 17.2 | 26.0 | 2.50 | 0.37 | 78 | 880 | 85 | 840 |
| 35 (comp.) | 48.0 | 8.8 | 17.2 | 26.0 | 2.50 | 0.50 | 110 | 430 | 126 | 333 |
| 36 (comp.) | 48.0 | 8.8 | 17.2 | 26.0 | 3.00 | 0.13 | | Sintering did not occur | | |
| 37 (comp.) | 48.0 | 8.8 | 17.2 | 26.0 | 3.00 | 0.25 | | Sintering did not occur | | |
| 38 (comp.) | 48.0 | 8.8 | 17.2 | 26.0 | 3.00 | 0.28 | | Sintering did not occur | | |
| 39 (comp.) | 48.0 | 8.8 | 17.2 | 26.0 | 3.00 | 0.31 | | Sintering did not occur | | |
| 40 (comp.) | 48.0 | 8.8 | 17.2 | 26.0 | 3.00 | 0.34 | | Sintering did not occur | | |
| 41 (comp.) | 48.0 | 8.8 | 17.2 | 26.0 | 3.00 | 0.37 | | Sintering did not occur | | |
| 42 (comp.) | 48.0 | 8.8 | 17.2 | 26.0 | 3.00 | 0.50 | | Sintering did not occur | | |
| 43 (comp.) | 43.0 | 8.8 | 17.2 | 31.0 | 2.00 | 0.28 | 41 | 1405 | 42 | 1440 |
| 44 | 46.0 | 8.8 | 17.2 | 28.0 | 2.00 | 0.28 | 64 | 1047 | 73 | 917 |
| 45 | 48.5 | 8.8 | 17.2 | 25.5 | 1.00 | 0.28 | 124 | 456 | 149 | 409 |
| 46 (comp.) | 49.5 | 8.8 | 17.2 | 24.5 | 1.00 | 0.28 | | Sintering did not occur | | |
| 47 (comp.) | 49.8 | 8.8 | 17.2 | 24.2 | 2.00 | 0.28 | | Sintering did not occur | | |
| 48 (comp.) | 48.0 | 4.0 | 15.2 | 32.8 | 2.00 | 0.28 | | Sintering did not occur | | |
| 49 | 48.0 | 6.5 | 15.2 | 30.3 | 2.00 | 0.28 | 57 | 1163 | 70 | 960 |
| 50 | 48.0 | 10.0 | 15.2 | 26.8 | 2.00 | 0.28 | 60 | 980 | 91 | 720 |
| 51 | 48.0 | 13.0 | 15.2 | 23.8 | 2.00 | 0.28 | 69 | 840 | 99 | 615 |
| 52 (comp.) | 48.0 | 16.0 | 15.2 | 20.8 | 2.00 | 0.28 | 91 | 610 | 83 | 540 |
| 53 (comp.) | 48.0 | 8.8 | 0.5 | 42.7 | 2.00 | 0.28 | 8 | 3190 | 8 | 3200 |
| 54 | 48.0 | 8.8 | 25.0 | 18.2 | 2.00 | 0.28 | 112 | 549 | 130 | 521 |
| 55 | 48.0 | 8.8 | 30.0 | 13.2 | 2.00 | 0.28 | 145 | 353 | 152 | 346 |
| 56 (comp.) | 48.0 | 8.8 | 35.0 | 8.2 | 1.00 | 0.28 | 330 | 150 | 343 | 142 |

To have a graphical understanding of the advantages of the invention, the results of Table 1 above are plotted in FIG. 1. From the results set out in Table 1 and illustrated in FIG. 1, the advantages of the invention would be evident.

That is, it is understood that the ferrite composition of the invention contains 0.25 exclusive to 0.40% by weight of bismuth oxide on $Bi_2O_3$ basis and 1.00 to 2.50% by weight of tin oxide on $SnO_2$ basis relative to the given main component blend composition, ensuring a leap upward in direct-current bias characteristics.

The NiCuZn-base ferrites of the invention could be widely used in a variety of electrical parts industries.

What we claim is:

1. An NiCuZn-base ferrite consisting of as main components:
   iron oxide in an amount of 45.0 to 49.0 mol % on $Fe_2O_3$ basis,
   copper oxide in an amount of 5.0 to 14.0 mol % on CuO basis,
   zinc oxide in an amount of 1.0 to 32.0 mol % on ZnO basis
   nickel oxide accounting for the rest mol % on NiO basis,
   wherein, with respect to said main components,
   a weight percent of bismuth oxide is in an amount of 0.25 exclusive to 0.40% by weight on $Bi_2O_3$ basis, and
   a weight percent of tin oxide is in an amount of 1.00 to 2.50% by weight on $SnO_2$ basis.

2. An electronic part comprising an NiCuZn-base ferrite, wherein said ferrite consists of as main components:
   iron oxide in an amount of 45.0 to 49.0 mol % on $Fe_2O_3$ basis,
   copper oxide in an amount of 5.0 to 14.0 mol % on CuO basis,
   zinc oxide in an amount of 1.0 to 32.0 mol % on ZnO basis,
   nickel oxide accounting for the rest mol % on NiO basis,
   wherein, with respect to said main components
   a weight percent of bismuth oxide is in an amount of 0.25 exclusive to 0.40% by weight on $Bi_2O_3$ basis, and
   a weight percent of tin oxide is in an amount of 1.00 to 2.50% by weight on $SnO_2$ basis.

3. The electronic part as recited in claim 2, wherein said electronic part is a multilayer inductor or LC composite part that comprises:
   a coil conductor and a core portion comprising said ferrite,
   in which said core portion forms a closed magnetic circuit.

4. The NiCuZn-base ferrite, according to claim 1, consisting of:
   iron oxide in an amount of 47.0 to 48.8 mol % on $Fe_2O_3$ basis,
   copper oxide in an amount of 7.0 to 12.0 mol % on CuO basis,
   zinc oxide in an amount of 14.0 to 28.0 mol % on ZnO basis,
   nickel oxide accounting for the remaining mol %,
   bismuth oxide in an amount of 0.26 exclusive to 0.33% by weight on $Bi_2O_3$ basis, and
   tin oxide in an amount of 1.00 to 2.20% by weight on $SnO_2$ basis.

5. The electronic part comprising an NiCuZn-base ferrite, according to claim 2, wherein the NiCuZn-base ferrite consists of:
   iron oxide in an amount of 47.0 to 48.8 mol % on $Fe_2O_3$ basis,
   copper oxide in an amount of 7.0 to 12.0 mol % on CuO basis,
   zinc oxide in an amount of 14.0 to 28.0 mol % on ZnO basis,
   nickel oxide accounting for the remaining mol %,
   bismuth oxide in an amount of 0.26 exclusive to 0.33% by weight on $Bi_2O_3$ basis, and
   tin oxide in an amount of 1.00 to 2.20% by weight on $SnO_2$ basis.

* * * * *